Patented Apr. 12, 1932

1,853,544

UNITED STATES PATENT OFFICE

VERE B. BROWNE, OF BRACKENRIDGE, PENNSYLVANIA

PROCESS OF MAKING SILICON STEEL FROM SILICON SCRAP

No Drawing. Original application filed September 27, 1929, Serial No. 395,760. Divided and this application filed July 31, 1931. Serial No. 554,199.

This invention relates to a process of making silicon steel from silicon-containing scrap and more particularly relates to an improved process for obtaining a valuable product therefrom, and is a division of application 395,760, filed Sept. 27, 1929.

In the production, rolling and use of high grade silicon steel for electrical apparatus there is a considerable amount of scrap material produced which is available for remelting. This material contains sufficient silicon content so as to make the scrap very undesirable from certain points of view and as a result the market value of the scrap is considerably below that of ordinary steel scrap containing no silicon.

This material can be remelted either in an acid or a basic open hearth process but under such conditions the value of the silicon is entirely lost and moreover its presence is a serious interference with the normal operations of the process. In the case of the basic open hearth process the material is rarely used intentionally because in such a process the silicon is oxidized to silica which combines with the basic materials of the lining and forms a slag. Where such silicon-containing material is accidentally introduced into a charge without a suitable allowance having been made therefor by the addition of fluxes, the lining material of the furnace is subjected to considerable erosion. Where an acid open hearth process is used although the presence of the silicon in the scrap does not affect these linings, nevertheless, the excessive or continued use of the material results in retarded furnace operations with a consequent loss in production for the reason that the silicon must be oxidized and converted into silica before the furnace can function normally in its intended manner. It will, therefore, be apparent that both in the acid and in the basic open hearth processes the value of the silicon is not only lost but is a handicap.

It is one of the objects of the present invention to provide a process in which the silicon-containing scrap can be effectively and readily utilized in the making of silicon steel without any deleterious effects on the furnace or the process used.

It is another object of the invention to enable the silicon-containing scrap to be reclaimed and reworked into a valuable material in which the properties and the value of the silicon is retained.

It is a further object of the invention to provide a new process which is carried out in an apparatus never before used in this connection and to utilize both the process and the apparatus in an efficient and economical manner.

It is a still further object of the invention to charge the silicon-containing scrap into an ordinary electric arc furnace and to add suitable slag forming materials, which produce a protective coating of fluid slag and which become fluid at a relatively low temperature.

An additional object of the invention is to prevent the oxidation of the silicon in the silicon-containing scrap to silica.

Other and further objects of the invention will either be apparent as the description proceeds or will be pointed out hereinafter.

It is well known that the silicon contained in the above mentioned silicon-containing scrap has a considerable value which, if the material could be fully utilized, would be in the neighborhood of $.10 per pound. When it is considered how many tons of such scrap are produced, it will be seen that it is a great economical advantage to be able to utilize the scrap in a suitable manner without expensive apparatus involving prohibitive cost.

As far as I am aware such a process has been in a measure accomplished only by the use of the induction type of electric furnace in which practically no oxidation occurs so that the melted scrap contains substantially the full amount of silicon originally present in it. In this process likewise, appreciable contamination of the scrap from the absorption of carbon vapors and the like is not involved. As above mentioned, however, the cost of this equipment and the expense entailed in its operation is so great that the process of salvaging silicon scrap in this manner has not been practiced to any great extent because it is not economically justifiable.

From the standpoint of cost as well as from that of production it is recognized that it would be very desirable to remelt the scrap in an ordinary electric arc furnace, but previous attempts at such a process have proved failures, either because there has been an excessive loss of silicon or because the final product has been contaminated by the absorption of carbon from the arcs, the presence of which seriously affects the electrical value of the product. If the metal has absorbed such carbon it is impossible to remove it without oxidizing the silicon at the same time, which clearly defeats the object of the whole process.

I have, therefore, evolved a process according to the present disclosure which enables me to avoid all of the disadvantages mentioned above and which further secures additional advantages peculiar to itself. According to this invention I am able to remelt silicon scrap in an ordinary electric arc furnace without any serious loss of silicon and with practically no absorption of carbon or only such a slight amount at most as to be negligible in its influence on the final product.

In this process, I take a desired charge of scrap of any given silicon content and I charge the same onto the hearth of an ordinary electric arc furnace, preferably basically lined, and I then completely cover the charge with burnt lime. The electrodes of the furnace are then lowered so that they form the usual arc and as soon as melting begins, which proceeds as the charge is heated up, I add around the electrodes a sufficient quantity of lime, manganese ore and sand, which materials are slag forming and form a fluid slag at a relatively low temperature. This slag is an extremely fluid one and it immediately forms a protective layer on the initial pool of molten charge and thereby prevents the absorption of carbon from the electrodes during the melting. The manganese oxide in the slag takes care of any carbon vapor which may be given off at the arcs.

As soon as this protective slag is formed and melting is proceeding in a normal manner, I close the furnace tightly to exclude air therefrom and, if desired, I may use the further precaution of introducing into the furnace by means of any suitably arranged pipe or other device a neutral or reducing gas which displaces the atmosphere in the furnace and thereby additionally prevents the silicon in the charge in the furnace from oxidizing. If the furnace is of good construction so that it can be tightly closed such mere closing with consequent exclusion of air is all that is required, but I may take the additional precaution, if deemed necessary or desirable of displacing the atmosphere in the furnace with a neutral or reducing gas as aforesaid.

By the time the charge of steel has been completely melted the lime which was originally placed on top of the scrap, the slag forming materials which were placed around the electrodes and any small amount of silica which was produced during the melting combine to form a slag on the surface of the molten metal, thereby producing a protective covering which enables the operator then to open up the furnace and to remove the neutral or reducing gas if such has been introduced. Under usual and normal melting conditions it will be found that this slag is of a proper condition so that no further refining of the steel is generally necessary. The latter can then be tapped off and cast into ingots as soon as the proper temperature has been attained.

According to the above explained process, I have been able to melt down silicon-containing steel scrap with extremely little loss of silicon, such loss ordinarily not exceeding one-fourth of one percent and rarely exceeding one-half of one percent, and the carbon absorption is negligible.

The above description has been practically explained with relation to a basically lined furnace, but I am not limited under the principles of the present invention to such a basically lined furnace as the process can be practiced equally successfully with an acid furnace by a simple modification of the slag forming constituents which are used.

As an example of such an adaptation to an acid furnace, sand is used to cover the metal instead of burnt lime and the slag forming materials which form a slag at a relatively low temperature and which are placed around the electrodes are manganese ore, soda ash and sand. In all other essential details the process in an acid furnace is identical with that as explained above for the basically lined furnace.

It will thus be seen that the process of the present invention is of broad scope, and it is within the invention to vary temperature and details as indicated in commercial practice without departing from the limits or the principles explained above and set forth in the subjoined claims.

What I claim as new and desire to secure by Letters Patent is:

1. A process of making silicon steel from silicon-containing scrap including the steps of charging a portion of such silicon-containing scrap onto the hearth of an electric furnace, acid lined, covering the charge with sand, passing current, adding soda ash, manganese ore and sand which form a fluid slag on the molten portion of the charge at relatively low temperature, excluding air, attaining final temperature and tapping off the steel.

2. A process of making silicon steel from silicon scrap including the steps of charging the scrap onto the hearth of an electric furnace, acid lined, completely covering the scrap with sand, lowering the electrodes of the furnace to form an arc whereupon melting presently begins, adding soda ash, manganese ore and sand around the electrodes whereupon a protective layer of slag forms on the molten portion of the charge and prevents absorption by the charge of carbon from the electrodes, excluding outside air from the furnace, continuing melting to a predetermined temperature, allowing the soda ash, manganese ore and sand together with any silica formed to produce a protective covering for the whole molten charge, discontinuing the exclusion of outside air, tapping off the steel, and casting it.

3. A process of making silicon steel from silicon scrap including the steps of charging silicon-containing scrap onto the hearth of an electric arc furnace acid lined, covering the charge with sand, lowering the electrodes of the furnace to form an arc, adding materials forming a fluid slag at a relatively low temperature, excluding air, attaining final temperature, and tapping off the steel.

4. A process of making silicon steel from silicon scrap, including the steps of charging silicon scrap onto the hearth of an electric furnace acid lined, completely covering the charge with sand, lowering the electrodes of the furnace to form an arc, adding soda ash, manganese ore and sand which form a fluid slag at a relatively low temperature, excluding air, attaining final temperature, and tapping off the steel.

5. A process of making silicon steel from silicon scrap including the steps of charging silicon scrap onto the hearth of an electric furnace acid lined, covering the same with sand, lowering the electrodes of the furnace to form an arc whereupon melting begins, adding materials forming a fluid slag at a relatively low temperature whereupon a protective layer of slag forms on the molten portion of the charge, closing the furnace tightly to exclude air, continuing the melting to a predetermined temperature, allowing the sand, slag forming materials and any silica formed to produce a surface slag, and tapping off the steel.

6. A process of making silicon steel from silicon scrap including the steps of charging silicon scrap onto the hearth of an electric furnace acid lined, completely covering the same with sand, lowering the electrodes of the furnace to form an arc whereupon melting begins, adding soda ash, manganese ore and said which form a fluid slag at a relatively low temperature whereupon a protective layer of slag forms on the molten portion of the charge, closing the furnace to exclude outside air, continuing the melting to a predetermined temperature, allowing a surface slag to form, and tapping off the steel.

7. A process of making silicon steel from silicon scrap including the steps of charging the scrap onto the hearth of an electric arc furnace acid lined, completely covering the scrap with sand, lowering the electrodes of the furnace to form an arc whereupon melting presently begins, adding soda ash, manganese ore and sand around the electrodes whereupon a protective layer of slag forms on the molten portion of the charge and prevents absorption by the charge of carbon from the electrodes, excluding outside air from the furnace, continuing the melting to a predetermined temperature, allowing the soda ash, manganese ore and sand together with any silica formed to produce a protective covering for the whole molten charge, tapping off the steel, and casting it.

8. A process of making silicon steel from silicon scrap including the steps of charging the scrap onto the hearth of an electric arc furnace acid lined, completely covering the scrap with sand, lowering the electrodes of the furnace to form an arc whereupon melting presently begins, adding soda ash, manganese ore and sand around and under the electrodes whereupon a protective layer of slag forms on the molten portion of the charge and prevents oxidation of the charge and absorption by it of carbon from the electrodes, displacing the atmosphere from the furnace and substituting a non-oxidizing atmosphere therefor, continuing the melting to a predetermined temperature, allowing the soda ash, manganese ore and sand together with any silica formed to produce a protective covering for the whole molten charge, tapping off the steel and casting it.

9. A process of making silicon steel from silicon scrap including the steps of charging the scrap onto the hearth of an electric arc furnace acid lined, completely covering the scrap with sand, lowering the electrodes of the furnace to form an arc whereupon melting presently begins, adding soda ash, manganese ore and sand around and under the electrode whereupon a protective layer of slag forms on the molten portion of the charge and prevents oxidation of the charge and absorption by it of carbon from the electrodes, replacing the atmosphere in the furnace with a neutral or reducing gas, continuing the melting to a predetermined temperature, allowing the soda ash, manganese ore and sand together with any silica formed to produce a protective covering for the whole molten charge, tapping off the steel and casting it.

10. A process of making slicon steel from silicon-containing scrap, including the steps of charging a portion of such silicon-containing scrap onto the hearth of an electric arc furnace acid lined, covering the charged scrap with sand, passing electric current, adding soda ash, manganese ore and sand which form a fluid slag at a relatively low temperature, excluding air, attaining final temperature and tapping off the steel.

11. A process of making silicon steel from silicon-containing scrap, including the steps of charging a portion of such silicon-containing scrap onto the hearth of an electric furnace acid lined, covering the charged scrap with sand, passing electric current, covering the charge with slag forming materials viz, soda ash, manganese ore and sand, adapted to form a fluid slag at relatively low temperature, excluding air, attaining final temperature and tapping off the steel.

12. A process of making silicon steel from silicon scrap comprising charging silicon-containing scrap onto the hearth of an acid lined electric arc furnace, adding sand on the scrap, passing electric current, adding materials forming a fluid slag at a relatively low temperature, and finishing while excluding the admission of air.

In testimony whereof, I have hereunto subscribed my name this 23rd day of July, 1931.

VERE B. BROWNE.